(12) United States Patent
Wang

(10) Patent No.: US 8,749,738 B2
(45) Date of Patent: Jun. 10, 2014

(54) LIQUID CRYSTAL PANEL AND MANUFACTURING METHOD THEREOF, AND LIQUID CRYSTAL DISPLAY

(75) Inventor: Yewen Wang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 137 days.

(21) Appl. No.: 13/376,663

(22) PCT Filed: Dec. 6, 2011

(86) PCT No.: PCT/CN2011/083561
§ 371 (c)(1),
(2), (4) Date: Dec. 7, 2011

(87) PCT Pub. No.: WO2013/078712
PCT Pub. Date: Jun. 6, 2013

(65) Prior Publication Data
US 2013/0141687 A1 Jun. 6, 2013

(30) Foreign Application Priority Data
Dec. 2, 2011 (CN) .......................... 2011 1 03963036

(51) Int. Cl.
*G02F 1/1333* (2006.01)

(52) U.S. Cl.
USPC .......................................... 349/110; 428/323

(58) Field of Classification Search
None
See application file for complete search history.

(56) References Cited

U.S. PATENT DOCUMENTS

| | | | |
|---|---|---|---|
| 7,460,197 B2 * | 12/2008 | Yi et al. ........................ | 349/106 |
| 2003/0020847 A1 | 1/2003 | Kim et al. | |
| 2007/0132921 A1 * | 6/2007 | Yoon .............................. | 349/107 |
| 2009/0068575 A1 * | 3/2009 | Fujimaki et al. .................. | 430/7 |
| 2009/0109363 A1 * | 4/2009 | Yu et al. .......................... | 349/43 |
| 2010/0045589 A1 * | 2/2010 | Edwards et al. .............. | 345/102 |
| 2012/0200950 A1 * | 8/2012 | Shim et al. .................... | 359/891 |

FOREIGN PATENT DOCUMENTS

| CN | 101071185 A | 11/2007 |
|---|---|---|
| CN | 101295090 A | 10/2008 |
| CN | 101295090 A | 10/2008 |
| CN | 101393343 A | 3/2009 |
| CN | 101393343 A | 3/2009 |
| CN | 101558351 A | 10/2009 |
| CN | 102156368 A | 8/2011 |
| CN | 102156368 A | 8/2011 |

OTHER PUBLICATIONS

Hu Yang, The International Searching Authority written comments, Sep. 2012, CN.
Zhang Peng, The first office action, Aug. 2013, CN.

* cited by examiner

*Primary Examiner* — Lucy Chien
(74) *Attorney, Agent, or Firm* — IPro, Inc.; Na Xu

(57) ABSTRACT

The present invention discloses a liquid crystal panel and a manufacturing method thereof, and a liquid crystal display; the manufacturing method of the liquid crystal panel comprises the following steps: conducting materials are mixed into black matrix coating materials and black matrix deposition is conducted. In the present invention, because the conducting materials are mixed into the black matrix coating materials, the black matrix can conduct electricity and therefore, the liquid crystal panel can conduct static electricity by the conductivity of the black matrix to protect the liquid crystal panel and assemblies on the liquid crystal panel; the reliability of the liquid crystal panel is increased, because of the conductivity of the black matrix, the liquid crystal panel does not need additional conducting design (i.e. a layer of electrodes does not need to be deposited on the color film substrate of the liquid crystal panel), a deposition technology is omitted, production efficiency is increased and the production cost of the liquid crystal panel is economized.

10 Claims, 1 Drawing Sheet

LIQUID CRYSTAL PANEL AND MANUFACTURING METHOD THEREOF, AND LIQUID CRYSTAL DISPLAY

TECHNICAL FIELD

The present invention relates to the field of liquid crystal display, in particular to a liquid crystal panel and a manufacturing method thereof, and a liquid crystal display.

BACKGROUND

Liquid crystal displays have the advantages of small volume, less consumption, etc., and have been applied in the life and work of people, such as computers, televisions, etc.

The liquid crystal panel is the important assembly of the liquid crystal display and usually produces thousands of volts of static electricity because of friction, etc. High-voltage static electricity can be conducted to the public electrode of the liquid crystal panel and rapidly discharge to produce high-strength instantaneous current; simultaneously static electricity outside the liquid crystal panel can cause the public electrode to produce a large number of induced charges to form high-strength current; and after current is transferred to an IC circuit, components and parts on the circuit are easy to damage so that the liquid crystal display is damaged. Therefore, conducting design is usually conducted on the color film substrate of the liquid crystal panel; for example, a conducting layer is deposited on the color film substrate and ITO, IZO, AZO, GZO, etc., are used to conduct static electricity for protecting the liquid crystal display.

FIG. 1 is the section view of a liquid crystal panel. The liquid crystal panel includes a first substrate 201 and a second substrate 202; the first substrate 201 and the second substrate 202 are opposed; a liquid crystal layer 203 is held between the first substrate 201 and the second substrate 202; and the edge between the first substrate 201 and the second substrate 202 is provided with sealant 204 and an electric conductor 205. A black matrix 211 and a color filtering film 241 are deposited on the surface of the inner side of the first substrate 201, and a public electrode 251 is formed on the upper surfaces of the black matrix 211 and the color filtering film 241. The black matrix 211 has a two-layer structure; the first layer thereof is a conducting layer 221; the second layer as an insulating layer 231 is formed on the conducting layer 221; the conducting layer 221 is made of conducting materials, and the electric conductor 205 is connected with a ground wire 242, by the contact of the edge of the conducting layer 221 and the electric conductor 205, to conduct static electricity for protecting the liquid crystal panel and assemblies thereof. Sometimes the conducting layer is arranged on the surface of the outer side of the first substrate. However, both methods above include the deposition process of the conducting layer on glass; much production time is consumed and the production efficiency of the liquid crystal panel is reduced.

SUMMARY

The aim of the present invention is to provide a low-cost high-reliability liquid crystal panel and a manufacturing method thereof, and a liquid crystal display.

The aim of the present invention is achieved by the following technical schemes: a manufacturing method of a liquid crystal panel comprises the following steps:

Step A: conducting materials are mixed into black matrix coating materials;

Step B: black matrix deposition is conducted.

Preferably in Step A, the conducting materials are carbon nanotubes. Carbon nanotubes have good conductivity and can well disperse in organic solvents.

Preferably in Step A, the conducting materials are carbon black. Carbon black is relatively easy to prepare and the price of the carbon black is low.

Preferably in Step A, after the conducting materials are mixed, the conducting materials are uniformly dispersed in black matrix coating materials by dispersing treatment. Therefore, the deposited black matrix has good conductivity.

Preferably in Step A, the conducting materials are uniformly dispersed in black matrix coating materials by ultrasonic waves in the dispersing treatment. The mode of ultrasonic dispersion is much simpler, and simultaneously the mode can effectively cause the carbon nanotubes to disperse in the black matrix coating materials.

A liquid crystal panel comprises an upper substrate and a lower substrate; the upper substrate is provided with a black matrix and conducting materials are mixed into the black matrix.

Preferably the conducting materials are carbon nanotubes. Carbon nanotubes have good conductivity and can well disperse in organic solvents.

Preferably the conducting materials are carbon black. Carbon black is relatively easy to prepare and the price of the carbon black is low.

Preferably the edge of the black matrix is provided with a conducting wire connected with a ground wire. Therefore, the black matrix can be connected with the ground wire to conduct static electricity.

Preferably the conducting wire is conducted to the ground wire by an Au ball in sealant on the edge of the liquid crystal panel. The black matrix contacts the Au ball and is connected with the ground wire to conduct static electricity.

Preferably the conducting wire is a copper wire connected with the edge of the black matrix by being arranged at the frame of the liquid crystal panel. Only the copper wire needs to be arranged on the edge; the mode is simple and the cost is low.

A liquid crystal display comprises the liquid crystal panel.

In the present invention, because the conducting materials are mixed into the black matrix coating materials, the black matrix can conduct electricity; therefore, the liquid crystal panel can conduct static electricity by the conductivity of the black matrix to protect the liquid crystal panel and assemblies on the liquid crystal panel; the reliability of the liquid crystal panel is increased, because of the conductivity of the black matrix, the liquid crystal panel does not need additional conducting design (i.e. a layer of electrodes does not need to be deposited on the color film substrate of the liquid crystal panel); a deposition technology is omitted, production efficiency is increased and the production cost of the liquid crystal panel is economized.

Wherein: 201. first substrate, 202. second substrate, 203. liquid crystal layer, 204. sealant, 205. electric conductor, 211. black matrix, 241. color filtering film, 242. ground wire, 251. public electrode.

DETAILED DESCRIPTION

The present invention is further described by figures and the preferred embodiments as follows.

Figure 1:
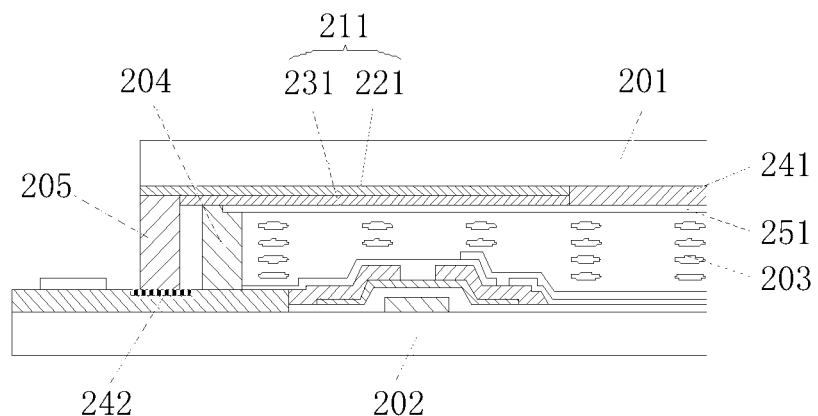
FIG. 1 is the structural sectional diagram of the liquid crystal panel.

The present invention provides a liquid crystal panel and a manufacturing method thereof, as shown in FIG. 1; the manufacturing method comprises the following steps: Step A: conducting materials are mixed into black matrix coating materials; Step B: a black matrix is formed. The liquid crystal panel comprises a first substrate and a second substrate, the first substrate is provided with the black matrix, and the conducting materials are mixed into the black matrix.

P electrons of carbon atoms on carbon nanotubes form large-scale delocalization pi bondings, and because of notable conjugated effect, electronic property is good. Chinese patent CN101830456 discloses a method for increasing the network conductivity of the carbon nanotubes; in the method, the powder of the carbon nanotubes is put in organic solvents to form muddy solution and the carbon nanotubes are uniformly dispersed in the organic solvents by ultrasonic dispersion. Therefore, in the present invention, carbon nanotubes are uniformly dispersed in black matrix coating solution by mixing the carbon nanotubes into the black matrix and dispersing through ultrasonic waves; the black matrix mixed with the carbon nanotubes is formed on the first substrate of the liquid crystal panel and the black matrix can conduct electricity; the black matrix is used for the design of static electricity protection (i.e. a conducting wire is designed at the edge of the black matrix) and static electricity is conducted for the purpose of the protection of the liquid crystal display.

In addition to carbon nanotubes, other good-conductivity materials can be mixed into the black matrix, such as carbon black, graphite, etc.

Figure 2:
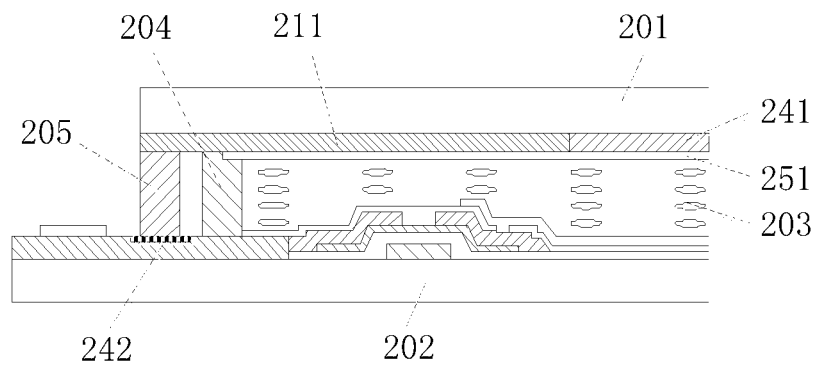
FIG. 2 is the structural sectional diagram of the liquid crystal panel of the embodiment of the present invention.

FIG. 2 is the diagram of the embodiment of the liquid crystal panel of the present invention, and the structural sectional diagram of the technical scheme of the present invention shows the liquid crystal panel with an FFS structure in FIG. 2. FIG. 2 is the sectional diagram of the existing liquid crystal panel. The liquid crystal panel comprises a first substrate 201 and a second substrate 202; the first substrate 201 and the second substrate 202 are opposed; a liquid crystal layer 203 is held between the first substrate 201 and the second substrate 202; and the edge between the first substrate 201 and the second substrate 202 is provided with sealant 204 and an electric conductor 205. A conducting black matrix 211 and a color filtering film 241 are deposited on the surface of the inner side of the first substrate 201, and a public electrode 251 is formed on the upper surfaces of the black matrix 211 and the color filtering film 241. The conducting black matrix 211 is mixed with carbon nanotube conducting materials to form a layer of conducting black matrix network; the edge of the conducting black matrix 211 is provided with a conducting wire and the conducting wire is connected with a ground wire; as shown in FIG. 2, the edge of the black matrix 211 contacts the electric conductor 205 and the electric conductor 205 is connected with a ground wire 242 to conduct static electricity for protecting the liquid crystal panel and assemblies thereof. For the liquid crystal panel having an Au ball conducting particle in the sealant, the black matrix contacts an Au ball, the edge of the black matrix is provided with a copper wire, and the black matrix can be connected with the ground wire by the Au ball or the copper wire.

For the traditional liquid crystal panel with an FFS structure, a layer of transparent conducting materials (such as ITO or IZO) needs to be prepared on the back of the first substrate 201 to conduct static electricity; for the embodiment, the preparation of a transparent electrode layer is not needed and the transparent conducting materials (such as ITO) can be saved.

For the liquid crystal panel with a COA structure, the color filtering film is not deposited on the color film substrate, but the color filtering film is formed in the preparation of the array substrate; however, the black matrix still exists on the color film substrate, and therefore, the conducting materials mixed with the carbon nanotubes are used to form the black matrix; the edge of the black matrix is designed with the conducting wire to conduct static electricity for protecting the liquid crystal panel and assemblies thereof. The additional design of static electricity protection is not needed and the technologies and the materials are reduced.

The above content is detailed description of the present invention by using specific preferred embodiments. However, this present invention is not limited to these specific embodiments. For the ordinary technical personnel of the technical field of the present invention, on the premise of keeping the conception of the present invention, the technical personnel can also make simple deductions or replacements, and all of which should be considered to belong to the protection scope of the present invention.

I claim:

1. A manufacturing method of a liquid crystal panel comprises the following steps:
    Step A: mixing carbon nanotubes into black matrix coating materials, wherein the carbon nanotubes are uniformly dispersed in black matrix coating materials by ultrasonic waves in a dispersing treatment;
    Step B: depositing black matrix and a color filtering film on a same layer of a substrate.

2. A liquid crystal panel, comprising: an upper substrate and a lower substrate; said upper substrate is provided with a black matrix and a color filtering film on a same layer, and carbon nanotubes are uniformly dispersed in black matrix coating materials by ultrasonic waves in a dispersing treatment.

3. A liquid crystal panel of claim 2, wherein the edge of the black matrix is provided with a conducting wire connected with a ground wire.

4. A liquid crystal panel of claim 3, wherein said conducting wire is conducted to the ground wire by an Au ball in sealant on the edge of the liquid crystal panel.

5. A liquid crystal panel of claim 3, wherein said conducting wire is a copper wire connected with the edge of the black matrix by being arranged at the frame of the liquid crystal panel.

6. A liquid crystal display, comprising: a liquid crystal panel; said liquid crystal panel comprises an upper substrate and a lower substrate, and said upper substrate is provided with a black matrix and a color filtering film, and carbon nanotubes are uniformly dispersed in black matrix coating materials by ultrasonic waves in a dispersing treatment.

7. A liquid crystal display of claim 6, wherein the edge of said black matrix is provided with a conducting wire connected with a ground wire.

8. A manufacturing method of a liquid crystal panel of claim 1, wherein a thickness of the black matrix is same with a thickness of the color filtering film.

9. A liquid crystal panel of claim 2, wherein a thickness of the black matrix is same with a thickness of the color filtering film.

10. A liquid crystal display of claim 6, wherein a thickness of the black matrix is same with a thickness of the color filtering film.

* * * * *